US008777186B2

(12) United States Patent
Russier et al.

(10) Patent No.: US 8,777,186 B2
(45) Date of Patent: Jul. 15, 2014

(54) PROTECTIVE ASSEMBLY AND METHOD FOR MOUNTING SAME, UPRIGHT AND SLEEVE OF SUCH A PROTECTIVE ASSEMBLY

(75) Inventors: Jonathan Russier, St. Martin de Valgalgues (FR); Brice Martigne, St. Martin de Valgalgues (FR)

(73) Assignee: Citynox, St. Martin de Valgalgues (FR)

( * ) Notice: Subject to any disclaimer, the term of this patent is extended or adjusted under 35 U.S.C. 154(b) by 0 days.

(21) Appl. No.: 13/805,064

(22) PCT Filed: Jun. 20, 2011

(86) PCT No.: PCT/FR2011/051419
§ 371 (c)(1),
(2), (4) Date: Apr. 3, 2013

(87) PCT Pub. No.: WO2011/157973
PCT Pub. Date: Dec. 22, 2011

(65) Prior Publication Data
US 2013/0207063 A1    Aug. 15, 2013

(30) Foreign Application Priority Data

Jun. 18, 2010  (FR) ..................................... 10 54879
Jun. 18, 2010  (FR) ..................................... 10 54885

(51) Int. Cl.
*E04H 17/00*    (2006.01)
(52) U.S. Cl.
USPC ....................................... 256/65.03

(58) Field of Classification Search
USPC .......... 256/65.01–65.05, 65.09, 65.11–65.14; 403/289, 290, 314
See application file for complete search history.

(56) References Cited

U.S. PATENT DOCUMENTS

| 3,822,053 A | 7/1974 | Daily |
| 4,149,701 A * | 4/1979 | Densen ....................... 256/65.03 |
| 2010/0193756 A1* | 8/2010 | Buckley ..................... 256/65.04 |

FOREIGN PATENT DOCUMENTS

| BE | 1 011 490 A3 | 10/1999 |
| DE | 297 13 075 U1 | 9/1997 |
| EP | 0 006 322 A1 | 1/1980 |

* cited by examiner

*Primary Examiner* — Michael P Ferguson
*Assistant Examiner* — Daniel Wiley
(74) *Attorney, Agent, or Firm* — IM IP Law PLLC; C. Andrew Im

(57) ABSTRACT

The protection kit comprises at least one post comprising at least one side opening, at least one rail, and at least one sleeve comprising at least one deformable tab. The sleeve is operable to receive a rail within its interior and to enter a side opening with deformation of at least one tab. Preferably, at least one opening is fitted with a tooth and the tab is deformable elastically and comprises an opening to receive the tooth. The insertion of a sleeve into the opening of the post causes the tab to deform until the tooth is located in the opening of the tab and the insertion of the rail into the interior of the sleeve restrains the tab.

15 Claims, 15 Drawing Sheets

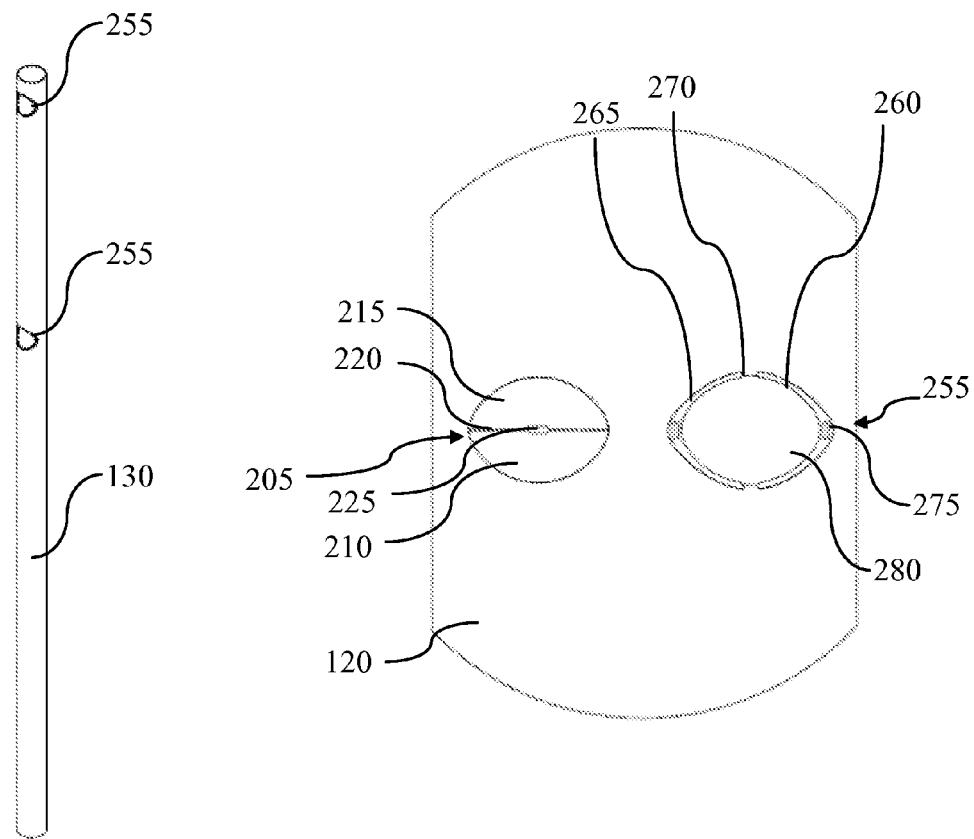
Figure 2
Figure 3
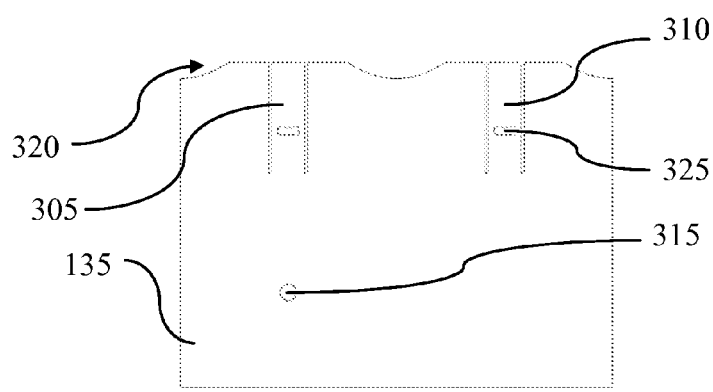
Figure 4 ic PROTECTIVE ASSEMBLY AND METHOD FOR MOUNTING SAME, UPRIGHT AND SLEEVE OF SUCH A PROTECTIVE ASSEMBLY

RELATED APPLICATIONS

This application is a §371 application from PCT/FR2011/051419 filed Jun. 20, 2011, which claims priority from French Patent Application No. 10 54885 filed Jun. 18, 2010 and French Patent Application No. 10 54879 filed Jun. 18, 2010, each of which is herein incorporated by reference in its entirety.

TECHNICAL FIELD OF INVENTION

This invention relates to a protection kit and its method of assembly, a post and a sleeve for such a protection kit. It applies to all protections of persons, wall protections, in particular for street furniture in public or private locations.

BACKGROUND OF THE INVENTION

Barriers known from the prior state of the art are made of metal parts welded together. Their realization time on site is consequently very long and requires the use of welding machines and specific protections. The final cost as well as the maintenance costs are therefore very high.

OBJECT AND SUMMARY OF THE INVENTION

The aim of this invention is to remedy these drawbacks.
To this end, according to a first aspect, this invention envisages a protection kit, which comprises:
  at least one post comprising at least one side opening;
  at least one rail and
  at least one sleeve comprising at least one deformable tab, designed to receive a rail within its interior and to enter one said opening with the deformation of at least one said tab.

Thanks to these provisions, a protection kit can be constituted by inserting a sleeve into a post, thanks to the deformation of the tabs, then by inserting a rail in the sleeve. By avoiding the need for welding, the manufacturing and maintenance costs of the protection kits manufactured in this way are reduced and the risk of work-related injuries is reduced.

According to particular features, at least one tab is deformable elastically.

According to particular features, at least one opening is fitted with a tooth and at least one tab comprises an opening designed to receive said tooth; inserting a sleeve into the opening of a post causes the tab to deform until said tooth is located in said opening of the tab; inserting the rail into the interior of the sleeve restrains the tab.

Thanks to each of these provisions, the tab can return to its original position after the sleeve has been inserted in the opening of the post and the rail has been inserted in the sleeve. A tooth formed on this opening can then be inserted into an opening of the tab.

According to a second aspect, this invention envisages a protection kit post for a protection kit that is the subject of this invention as described above, which comprises at least one first pre-scoring to form, along the tear-out of at least one pre-scored portion, a first opening for a sleeve comprising a deformable tab or a second opening for a rail with a smaller diameter than the sleeve.

According to particular features, the sleeve comprises, in a location diametrically opposite the first pre-scoring, a second pre-scoring to form, after tearing out, an opening to receive a rail with a smaller diameter than the sleeve.

According to particular features, the second pre-scoring comprises two symmetrical portions separated by a slot and by an opening designed to receive the head of a tool.

The pre-scored portions can thus be torn out by inserting the head of a tool, typically a flat-head screwdriver, and by moving it in a pivoting movement.

According to particular features, the first pre-scoring comprises two portions, which jointly substantially cover the gap between the projection of the transverse cross-section of a rail on the post and the projection of the transverse cross-section of a sleeve on the post, separated by teeth and each comprising an opening designed to receive the head of a tool.

The pre-scored portions can thus be torn out by inserting the head of a tool, typically a flat-head screwdriver, and by moving it in a pivoting movement.

According to particular features, at least one post has two openings for sleeves positioned at right angles and separated by a reinforcement.

In this way, an angle can be formed along the protection kit.

According to a third aspect, this invention envisages a sleeve for a protection kit that is the subject of this invention or to be secured to a protection kit post that is the subject of this invention, which comprises at least one deformable tab fitted with an opening and which is designed to receive a rail in its interior, restraining said tab.

According to a fourth aspect, the present invention envisages a method of assembly of a protection kit, which comprises:
  a step of positioning at least one post comprising at least one side opening,
  a step of inserting, in at least one said opening, a sleeve comprising at least one deformable tab, with at least one said tab being deformed and
  a step of inserting a rail in said sleeve.

As the particular characteristics, advantages and aims of this post, of this sleeve and of this method are similar to those of the protection kit that is the subject of this invention, they are not repeated here.

According to a fifth aspect, this invention envisages a protection kit, which comprises:
  at least one post;
  at least one base plate, comprising a lower portion designed to be fastened to the ground and an upper portion fitted with longitudinal slots exiting at its upper extremity, said base plate being designed to receive the post in its interior;
  an anchor plate comprising openings designed to let the parts of the upper portion separated by the slots pass through and
  a locking cone designed to surround the post and to cause, when it is moved vertically downwards, the parts of the upper portion separated by the slots on the post to be crushed, so as to attach the post onto the base plate.

Thanks to these provisions, the assembly of a post on a base plate can be performed without welding. By avoiding the need for welding, the manufacturing and maintenance costs of the protection kits manufactured in this way are reduced and the risk of work-related injuries is reduced.

According to particular features, the protection kit comprises intermediate slots interspersed between said longitudinal slots and shorter than said longitudinal slots.

Thanks to these provisions, the flexibility of the portion deformed by the locking cone is increased, which improves the tightening of the post.

According to particular features, the protection kit comprises:
- at least one post comprising at least one side opening;
- at least one rail and
- at least one sleeve comprising at least one deformable tab, designed to receive a rail within its interior and to enter one said opening with the deformation of at least one said tab.

Thanks to these provisions, a protection kit can be constituted by inserting a sleeve into a post, thanks to the deformation of the tabs, then by inserting a rail in the sleeve. By avoiding the need for welding, the manufacturing and maintenance costs of the protection kits manufactured in this way are reduced and the risk of work-related injuries is reduced.

According to particular features, at least one opening is fitted with a tooth and at least one tab comprises an opening designed to receive said tooth; inserting a sleeve into the opening of a post causes the tab to deform until said tooth is located in said opening of the tab; the rail restrains said tab.

Thanks to each of these provisions, the tab can return to its original position after the sleeve has been inserted in the opening of the post and a tooth formed on this opening can then be inserted in an opening of the tab.

According to particular features, the protection kit comprises a post, which comprises at least one first pre-scoring to form, along the tear-out of at least one pre-scored portion, a first opening for a sleeve comprising a deformable tab or a second opening for a rail with a smaller diameter than the sleeve.

According to particular features, the sleeve comprises, in a location diametrically opposite the first pre-scoring, a second pre-scoring to form, after tearing out, an opening to receive a rail with a smaller diameter than the sleeve.

According to particular features, the second pre-scoring comprises two symmetrical portions separated by a slot and by an opening designed to receive the head of a tool.

The pre-scored portions can thus be torn out by inserting the head of a tool, typically a flat-head screwdriver, and by moving it in a pivoting movement.

According to particular features, the first pre-scoring comprises two portions, which jointly substantially cover the gap between the projection of the transverse cross-section of a rail on the post and the projection of the transverse cross-section of a sleeve on the post, separated by teeth and each comprising an opening designed to receive the head of a tool.

The pre-scored portions can thus be torn out by inserting the head of a tool, typically a flat-head screwdriver, and by moving it in a pivoting movement.

According to a sixth aspect, the present invention envisages a method for assembling a protection kit, which comprises:
- a step of anchoring a base plate in the ground, comprising a lower portion designed to be fastened to the ground and an upper portion fitted with longitudinal slots exiting at its upper extremity, said base plate being designed to receive a post in its interior;
- a step of positioning an anchor plate by inserting the parts of the upper portions separated by the slots in the anchor plate's openings and
- a step of moving vertically downwards a locking cone that surrounds the post and causes the parts of the upper portion separated by the slots on the post to be crushed, so as to attach the post onto the base plate.

As the particular features, advantages and aims of this method of assembly are similar to those of the protection kit that was the subject of the fifth aspect of this invention, they are not repeated here.

The principal and particular characteristics of the various aspects of this invention are intended to be combined between themselves to form a protection kit and its method of assembly.

BRIEF DESCRIPTION OF THE DRAWINGS

Other advantages, aims and characteristics of the present invention will become apparent from reading the description that will follow, made, as an example that is in no way limiting, with reference to the drawings included in an appendix, wherein:

FIG. 2 represents, in perspective, a post of the protection kit shown in FIG. 1, FIG. 3 represents, in unfolded state, a portion of the post shown in FIG. 2, FIG. 4 represents, in unfolded state, an extremity of a sleeve of the protection kit shown in FIG. 1.

DETAILED DESCRIPTION OF THE EMBODIMENTS

Figure 1:
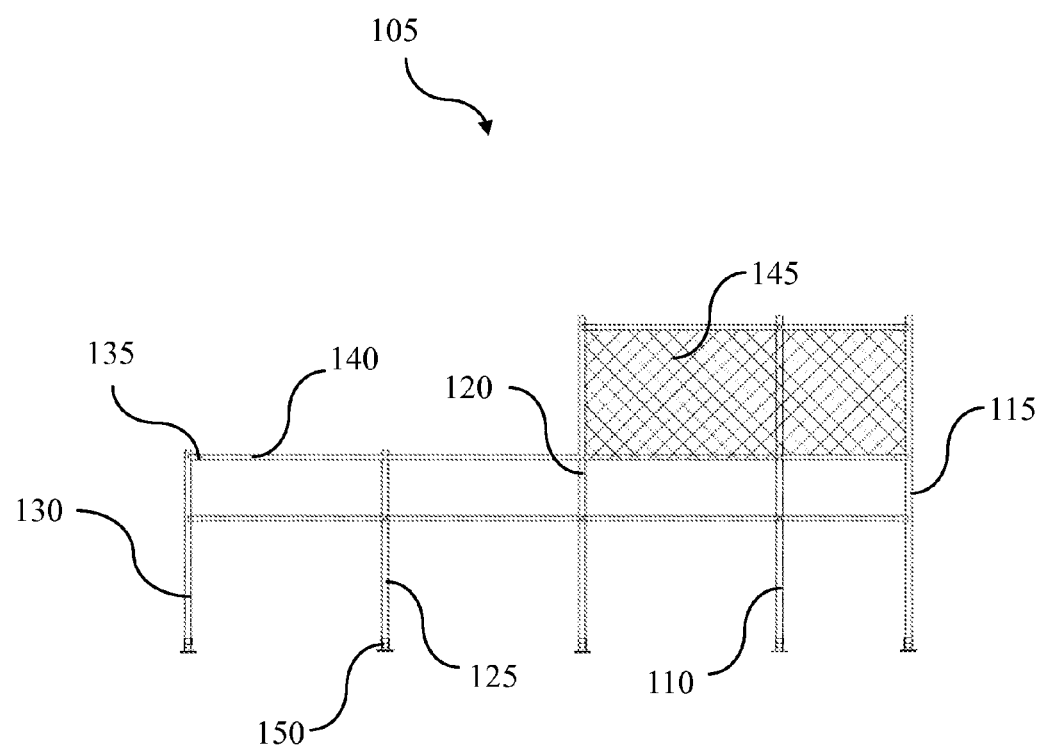
FIG. 1 represents, in a front view, a particular embodiment of the protection kit that is the subject of this invention.

FIG. 1 shows a protection kit 105 comprising upper posts 110, 115 and 120, lower posts 125 and 130, sleeves 135, rails 140, fencing or meshing 145 and feet 150.

Figure 17:
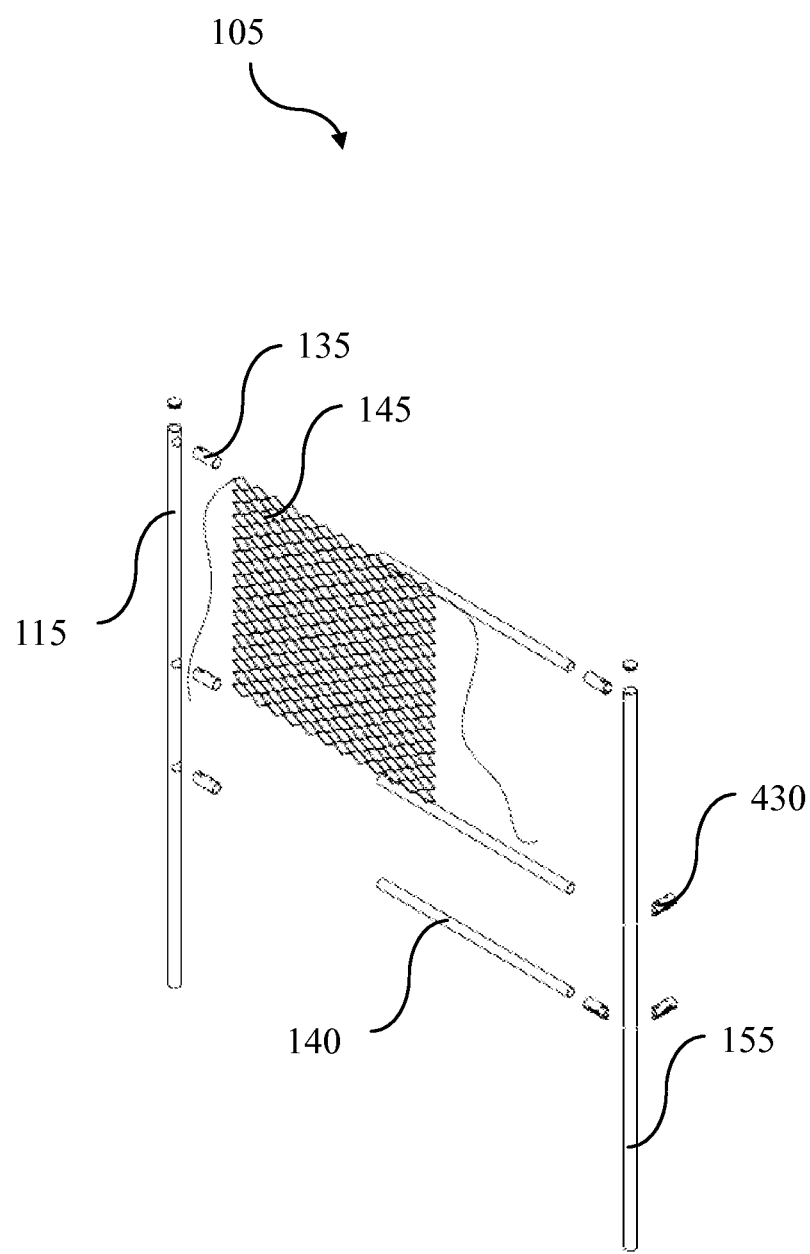
FIG. 17 represents, in a perspective, exploded view, a basic protection kit that is the subject of this invention.

All these elements are preferably metallic, for example made of stainless steel. The sleeves 135 are described with reference to FIG. 4. The fencing or mesh 145 is assembled as illustrated in FIG. 17. The feet 150 are described with reference to FIGS. 18 and 19.

The upper post 110 and the lower post 125 are called "pass-through posts" because all the rails 140 pass through them. The upper post 115 and the lower post 130 are called "extremity posts" because all the rails 140 that reach them end there. The post 120 is called "mixed post" because the upper rail ends there, whereas the lower rails pass through it.

Figure 16:
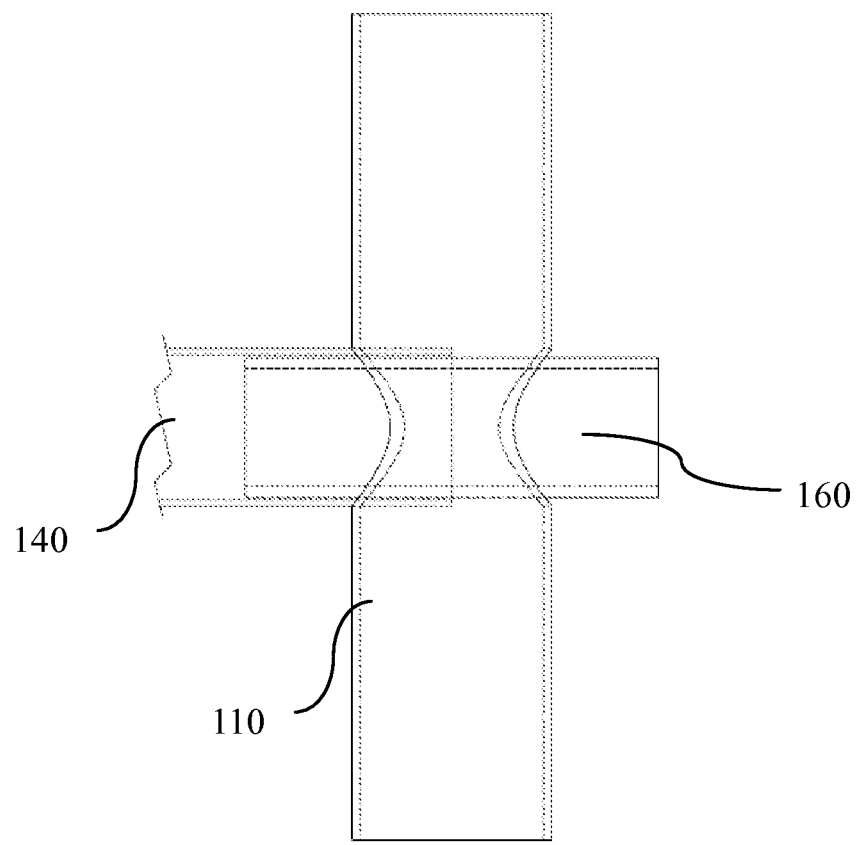
FIG. 16 represents, in a front view with hidden portions, a rail junction.

The sleeves 135 are present every time a rail ends, except if another rail comes after it, as illustrated in FIG. 16. In contrast, a rail passing through a post comprises no sleeve.

In the figures, the posts, the rails and the sleeves have a cylindrical shape with a circular base. However, this invention is not limited to this type of shape, but extends, on the contrary, to all cases where a post can receive a sleeve in an opening and where a rail can enter into a sleeve. In the case of the cylindrical shapes illustrated in the figures, the diameter of the rails is smaller than the diameter of the sleeves, which is itself smaller than the diameter of the posts.

FIGS. 2 and 3 show a post 120 comprising pre-scored openings 205 and 255. The pre-scored opening 205 is designed to receive a rail 140. It shape is therefore the projection of a circle with a diameter equal, excluding clearance, to the outer diameter of a rail 140, projected on the cylinder that gives the post 120 its general shape. The opening 205 comprises two symmetrical portions 210 and 215, separated by a horizontal slot (i.e. in a plane perpendicular to the axis of the post, whose position is vertical, once the protection kit has been assembled) 220 and by a horizontal opening 225 designed to receive the head of a flat-head screwdriver. The portions 210 and 215 are attached to the body of the post 120 by portions with no cut-out designed to be broken during a movement of a flat-head screwdriver inserted in the opening 225.

Figure 23:
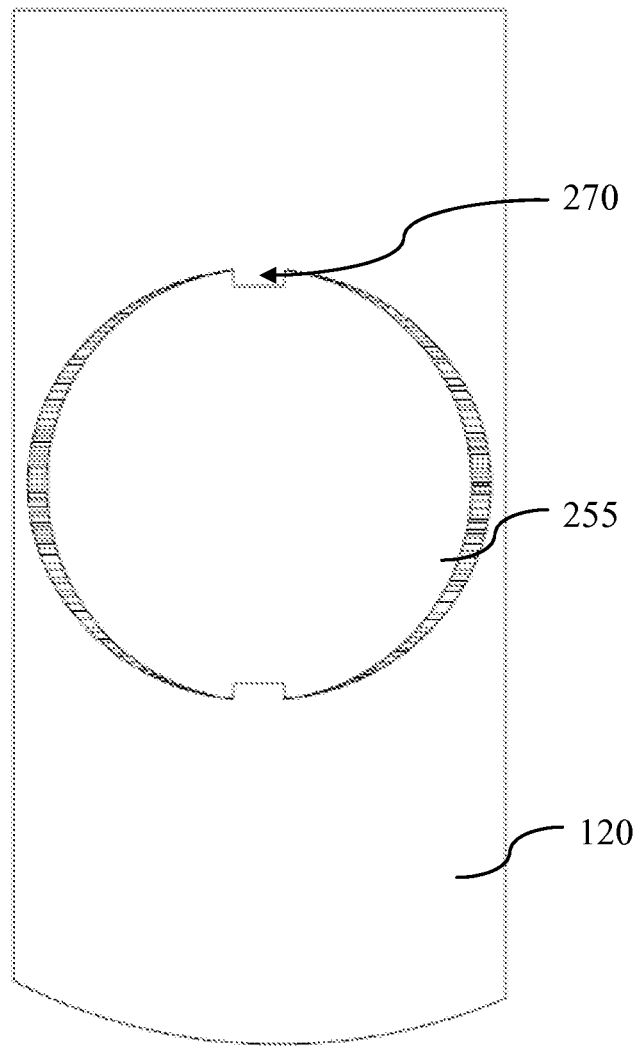
FIG. 23 represents, in a side view, a portion of a post illustrated in FIGS. 2 and 3.

The pre-scored opening 255, also shown in a front view in FIG. 23, is designed to receive a rail 140 or a sleeve 135. Its shape is therefore the projection of two circles with a diameter equal, respectively and excluding clearance, to the outer diameter of a rail 140 and of a sleeve 135, projected on the cylinder that gives the post 120 its general shape. The projection 280 of the smaller of these two circles, with a diameter, excluding clearance, equal to that the rails 140, is hollowed out.

The opening 255 comprises, between these two projections of circles, two symmetrical portions, 260 and 265, separated by vertical non-return teeth 270. They each comprise a vertical rectangular opening 275 designed to receive the head of a flat-head screwdriver. The portions 260 and 265 are attached to the body of the post 120 by portions with no cut-out designed to be broken during a movement of a flat-head screwdriver inserted in the opening 275.

Figure 5:
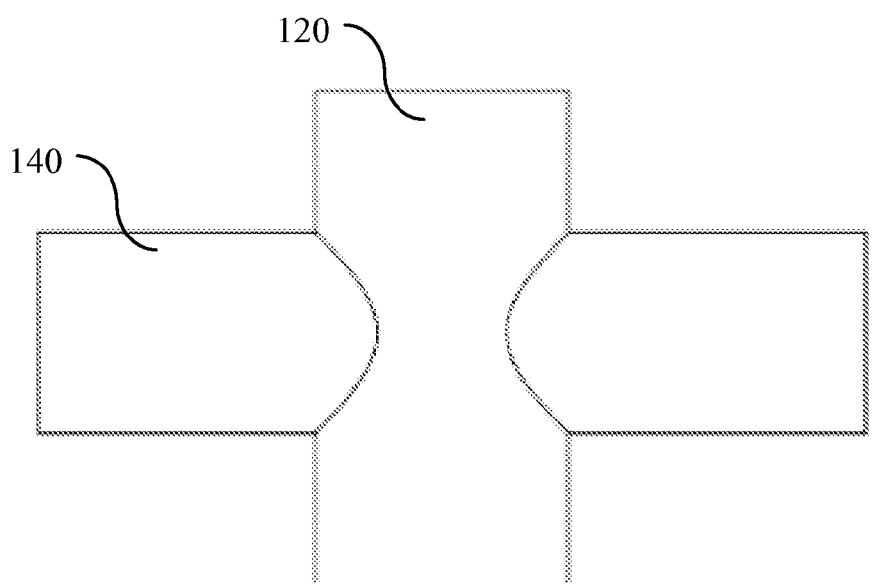
FIG. 5 represents, in a front view, a rail passing through a post.

When a rail 140 must pass through a post 120, the portions 210 and 215 are torn out. FIG. 5 thus shows a rail 140 passing through a post 120. When the post has to carry a sleeve 135 without the latter joining two rails 140, the portions 260 and 265 are torn out.

As can be seen in the unfolded state shown in FIG. 4, a sleeve 135 has two tabs 305 and 310 formed by cutting out. These tabs are rectangular and parallel with the axis of the sleeve 135. Each tab has a rectangular opening 325 designed to receive a non-return tooth 270. The sleeve 135 also has a circular opening 315 destined to receive a rivet to secure a rail 140 in the sleeve 135. The sleeve 135 also has some material removed 320 intended to increase the penetration depth of the sleeve 135 into a post.

Figure 6:
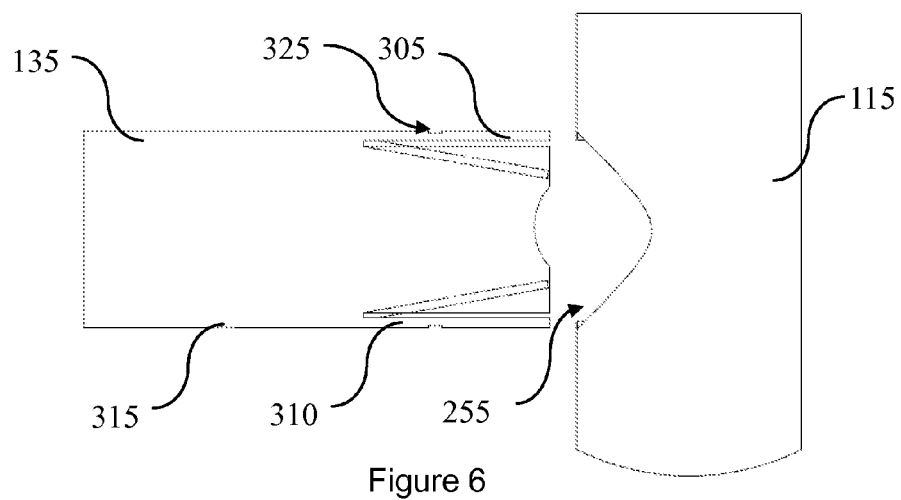
FIGS. 6 and 7 represent, in a cutaway front view and top view, respectively, the insertion of a sleeve in a post opening.
Figure 7:
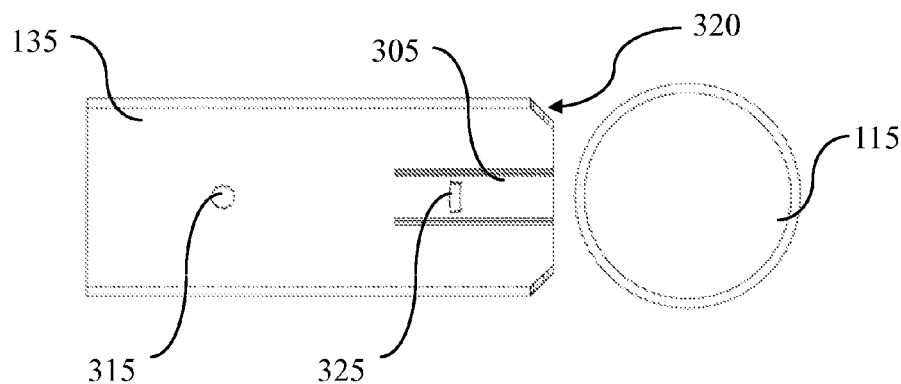
Figure 8:
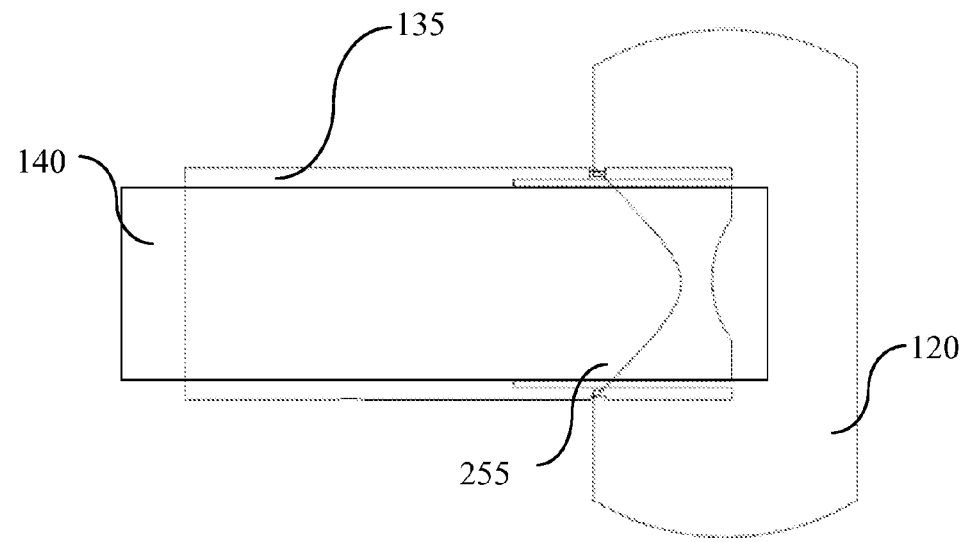
FIGS. 8 and 9 represent, in a cutaway front view and top view, respectively, the insertion of a rail in a sleeve inserted in a post opening.
Figure 9:
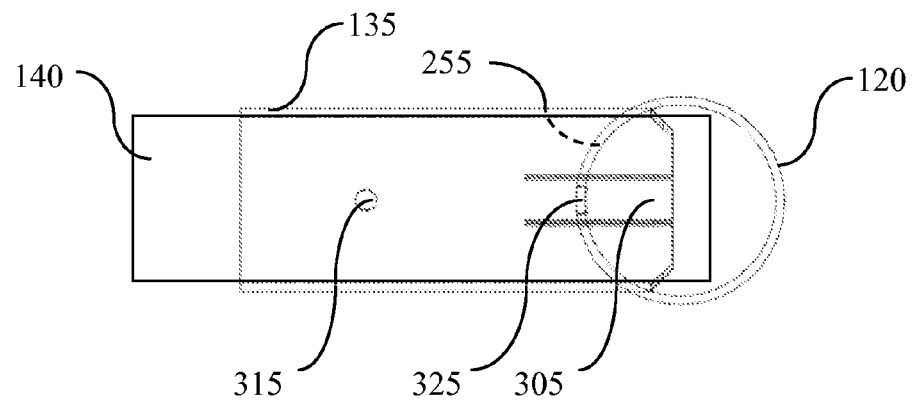

The tabs 305 and 310 are deformable. Preferably, their deformation upon insertion into a post, up to the insertion of the non-return teeth 270 in the openings 325, is elastic so that the tabs recover their original shape. FIGS. 6 and 7 illustrate this deformation. However, even if the tabs 305 and 310 do not deform in elastic manner, inserting a rail 140 in the sleeve 135 causes the tabs 305 and 310 to spread apart as shown in FIGS. 8 and 9.

In this way, inserting the rail 140 restrains the entire assembly. Consequently, no welding is required for this assembly.

Figure 10:
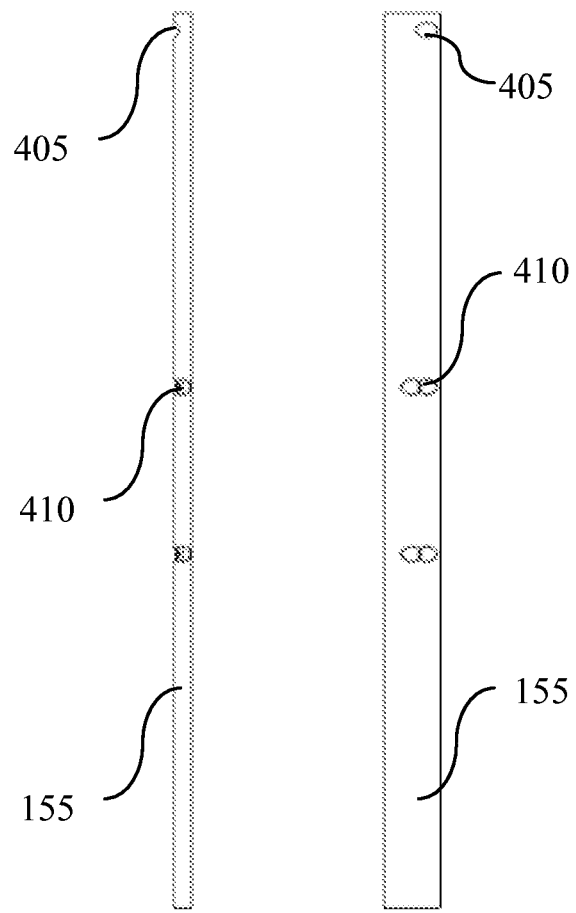
FIG. 10 represents, in a front view and in unfolded state, a post to realize a turn.
Figure 11:
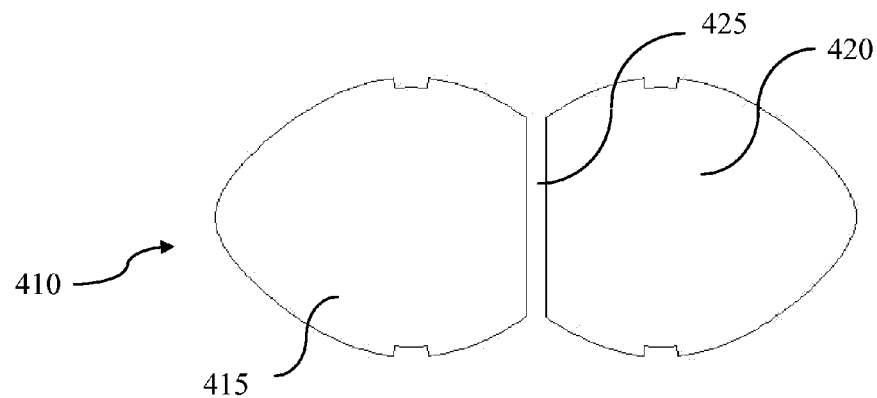
FIG. 11 represents a detail of the unfolded state illustrated in FIG. 10.
Figures 12, 13:
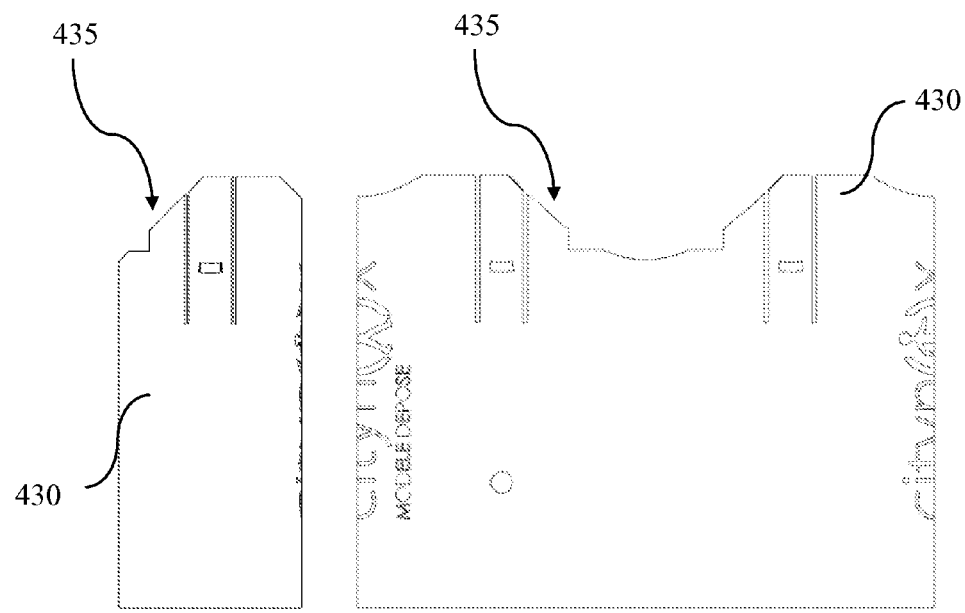
FIG. 12 represents in a top view, a sleeve for inserting into a post illustrated in FIG. 10.
FIG. 13 represents the sleeve illustrated in FIG. 12, in unfolded state.

FIG. 10 represents a mixed angle post 155. The post 155 has one single opening 405 and two double openings 410. The single opening 405 is similar to the opening 255. Each double opening 410 has two symmetrical shapes 415 and 420 separated by a central vertical reinforcement 425. Each of the symmetrical shapes is hollow and has more than half of the outer shape of the opening 255. Each of the symmetrical shapes 415 and 420 is designed to receive a sleeve 430, illustrated in FIGS. 12 and 13.

The sleeve 430 has the same shape as the sleeve 135 except in that it has some material removed 435 designed so that its edge rests on the reinforcement 425.

Figures 14, 15:
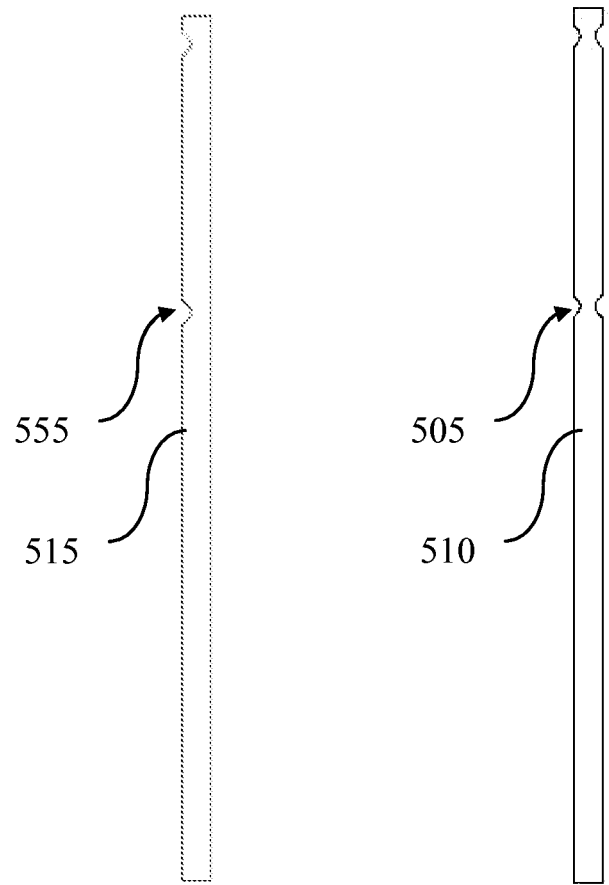
FIGS. 14 and 15 represent, in a front view, a protection kit extremity post and an intermediate post, respectively.

In embodiments other than that presented with reference to FIGS. 1 to 13, the extremity posts 515 and the pass-through posts 510 have openings 505 and 555 with no tear-out portion, as illustrated in FIGS. 14 and 15. The openings 505 match the passages for rails 140. The openings 555 match the insertion of sleeves 135.

FIG. 16 illustrates the case where an inner sleeve 160 is inserted between two rails 140 (only one rail 140 is represented in FIG. 16) one following on from the other, end-to-end.

FIG. 17 shows again the elements illustrated in FIGS. 1 to 12. The fencing or mesh 145 is fastened to the rails 140 in the following manner:
- the rails 140 are passed in the upper and lower loops of the mesh,
- extra lengths of cable are laced along the top and bottom of the mesh along the posts, passing through some loops of the mesh and
- each extremity of the cable is crimped.

Figure 22:
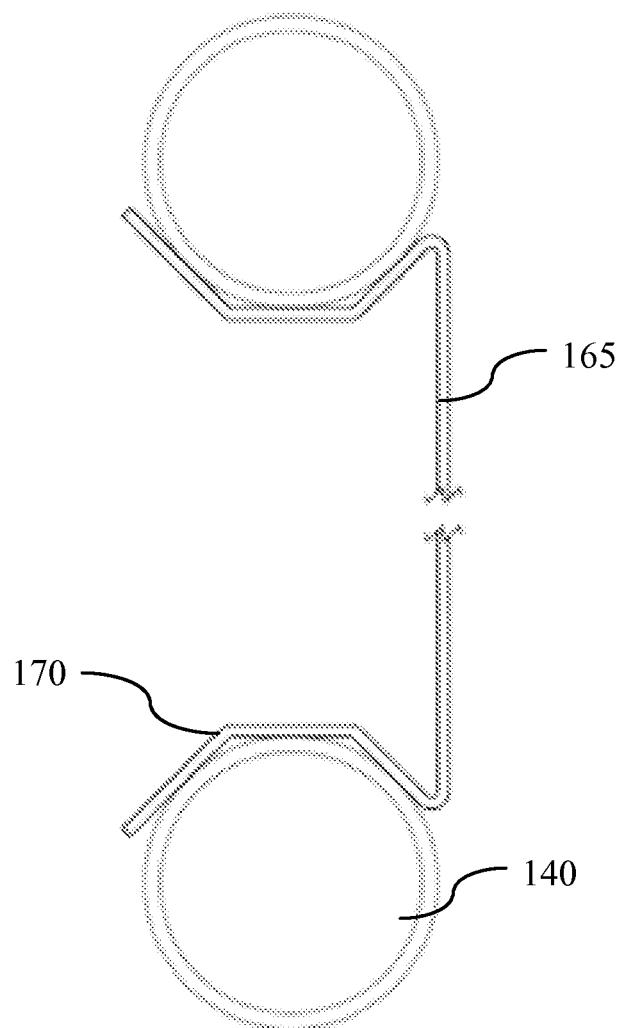
FIG. 22 represents, in a front view, a plate for a variant of the protection kit that is the subject of this invention

In embodiments, folded plates 165 are provided in addition to or instead of the mesh. FIG. 22 illustrates this case. These folded plates 165 are clipped onto the rails, thanks to end shapes with channels 170 wherein the rails 140 pass, and locked by rivets.

Figure 18:
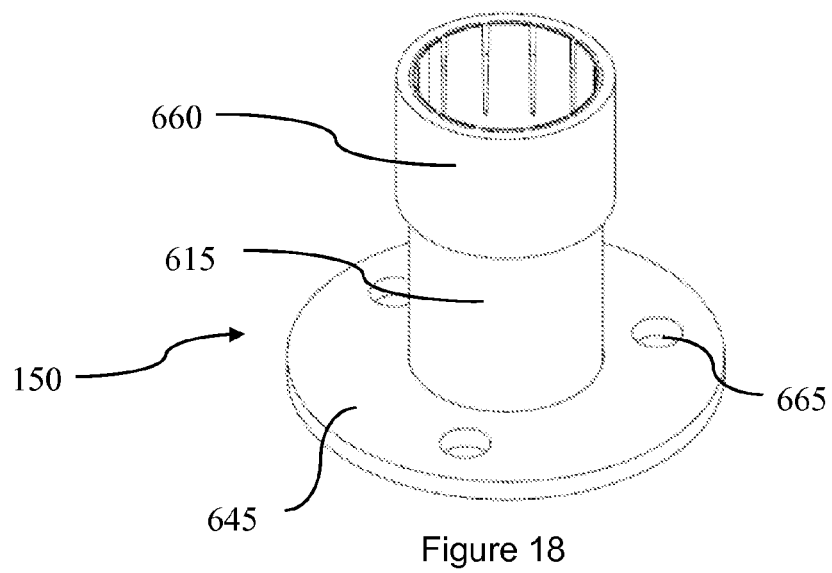
FIG. 18 represents, in perspective, the visible portion of a foot of a protection kit that is the subject of this invention, after anchoring in the ground.
Figure 19:
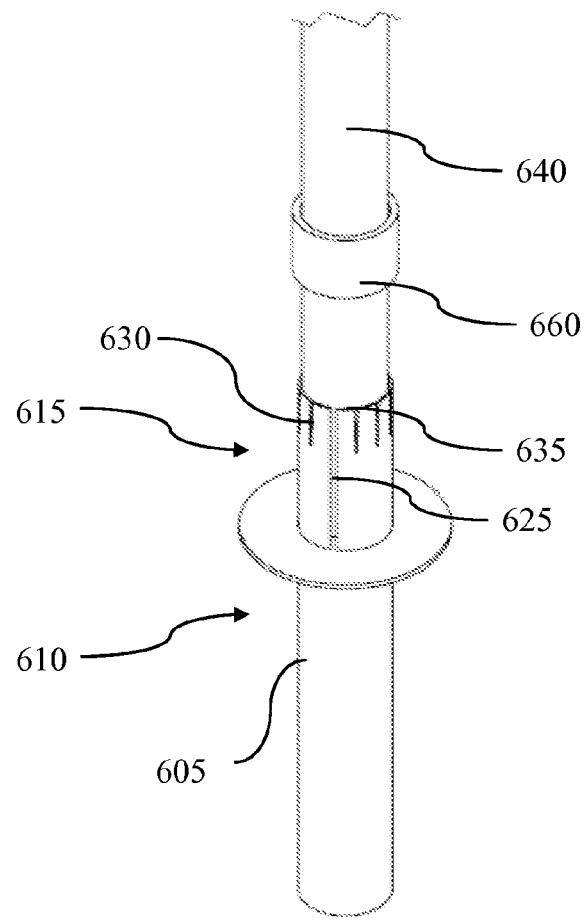
FIG. 19 represents, in perspective, a foot of a protection kit during assembly with a post.
Figure 20:
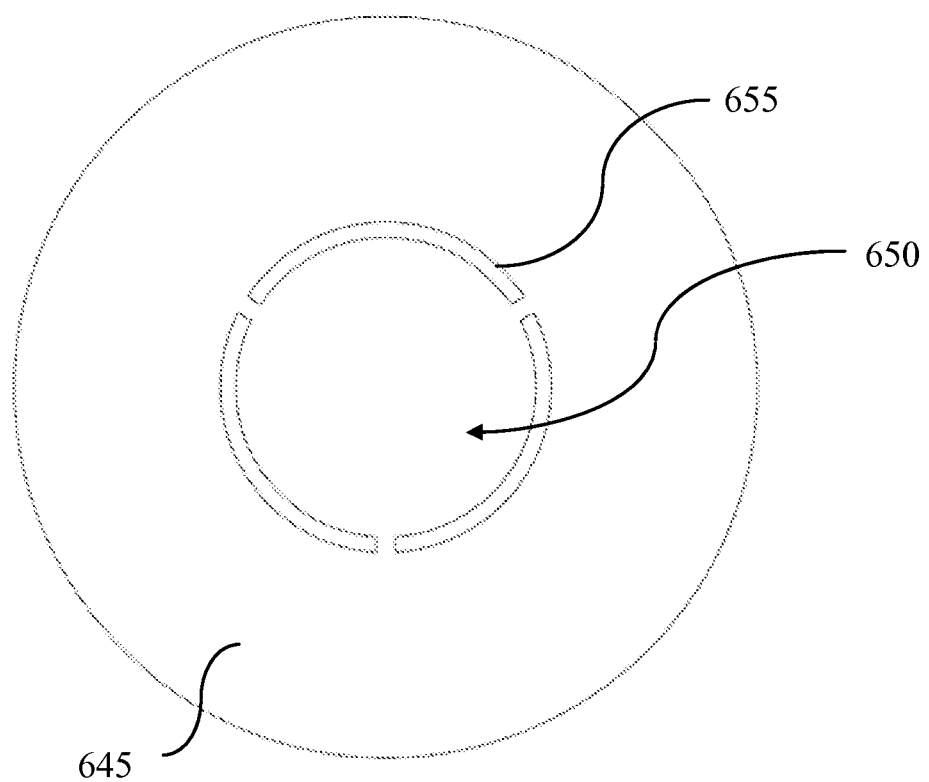
FIG. 20 represents, in a top view, an anchor plate of the foot illustrated in FIGS. 18 and 19.

As illustrated in FIGS. 18 to 20, the foot 150 comprises a base plate 605 designed to be fixed to the ground, which comprises a lower portion 610 positioned below ground level or at ground level (e.g. by screwing) and an upper portion 615 fitted with longitudinal slots 625 that exit at the upper extremity 635 of the upper portion 615.

The base plate 605 is designed to receive a post 640 in its interior.

An anchor plate 645 comprises openings 650 designed to let the parts 655 of the upper portion 615, separated by the slots 625, pass through. The anchor plate 645 also comprises circular openings 665 (not shown in FIG. 20) designed to position screws that form or reinforce the anchoring of the foot 150.

A locking cone 660 is designed to surround the upper portion 615 of the base plate 605 and to cause, when it is moved vertically downwards, the parts 655 of the upper portion 615 separated by the slots 625 to be crushed on the post 640, so as to attach the post 640 onto the base plate 605.

It should be noted that slots 630, shorter than the slots 625, are provided between the slots 625 so as to increase the flexibility of the upper portion 615 during the movement of the locking cone 660.

As is understood by reading the description above, assembling a protection kit and fastening it to the ground are performed without welding. By avoiding the need for welding, the manufacturing and maintenance costs of the protection kits manufactured in this way are reduced and the risk of work-related injuries is reduced.

Figure 21:
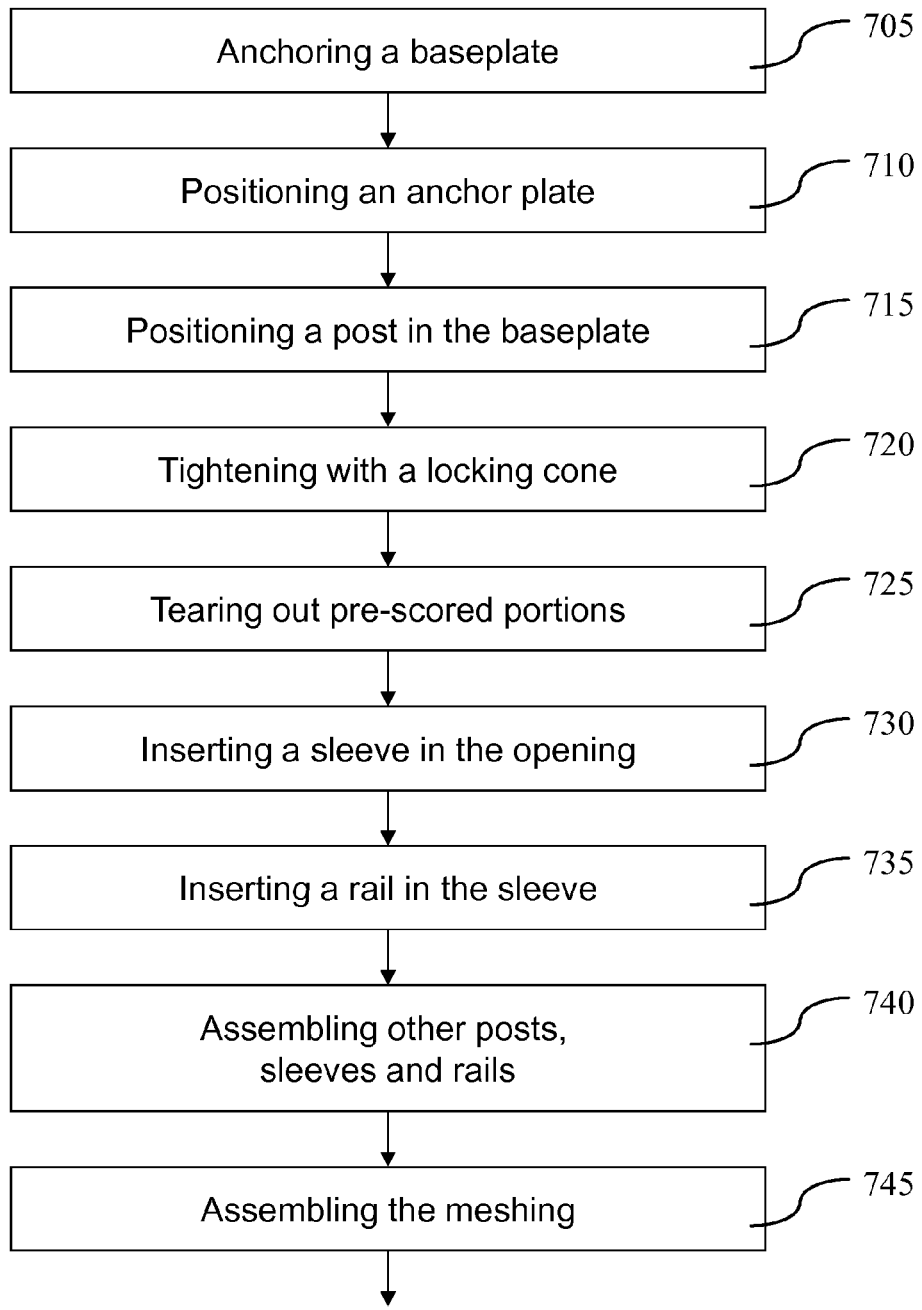
FIG. 21 represents, in the form of a logical diagram, steps utilized in a particular embodiment of the manufacturing method for a protection kit that is the subject of this invention.

As illustrated in FIG. 21, the method of assembly of a protection kit that is the subject of this invention comprises, for the first post 115:
- a step 705 of anchoring a base plate in the ground, said base plate comprising a lower portion positioned below ground level and an upper portion fitted with longitudinal slots exiting at its upper extremity, said base plate being designed to receive the post in its interior;
- a step 710 of positioning an anchor plate by inserting the parts of the upper portions separated by the slots in the anchor plate's openings and
- a step 715 of positioning at least one post comprising at least one side opening into said base plate;
- a step 720 of moving vertically downwards a locking cone that surrounds the base plate and causes the parts of the upper portion separated by the slots on the post to be crushed, so as to secure the post onto the base plate;
- a step 725 of tearing out the pre-scored portions 260 and 265 of each opening 255 of the post;
- a step 730 of inserting, in at least one said opening, a sleeve 135 comprising at least one deformable tab 305, with at least one said tab being deformed and
- a 735 step of inserting a rail 140 into said sleeve 135.

During a step 740, the other posts, sleeves and rails are assembled as described with reference to FIGS. 1 to 12, by tearing out the portions 210 and 220 or 260 and 265, depending on whether a rail is to end, pass through or be followed by another rail. The meshing 145 is fastened as described with reference to FIG. 17, during a step 745.

The invention claimed is:

1. A protection kit, comprising:
   at least one hollow post comprising at least one side opening formed through a portion of a side wall of the post, the side opening comprising a tooth on a periphery of the opening and extending toward a center of the opening;
   at least one rail having an outer diameter; and
   at least one tubular sleeve having opposing first and second ends and defining an inner diameter corresponding to the outer diameter of the rail, the sleeve further comprising at least one deformable tab formed at the first end of the sleeve, the tab comprising a portion of a side wall of the sleeve formed between cut-out sections of the side wall, such that a first end of the tab is connected to the sleeve and an opposing second end is radially deflectable, the tab having a unbiased state wherein the tab extends substantially parallel to the side wall of the sleeve and an inwardly biased state wherein the second end of the tab is deflected towards a center of the sleeve, the second end of the sleeve being configured to receive the at least one rail within its interior and the first end of the sleeve being configured to enter the at least one side opening;
   wherein said at least one tab comprises a hole configured to receive said tooth and located between the first and second ends of the tab;
   wherein the insertion of the first end of the sleeve into the at least one side opening of the post engages the second end of the at least one tab with the tooth and moves the at least one tab to the inwardly biased state to deform the tab until said tooth is located in the hole of the tab; and
   wherein the insertion of the at least one rail into the second end of the sleeve moves the at least one tab to the unbiased state with the tooth fully engaged in the hole, thereby locking the sleeve, the post and the rail to each other.

2. The protection kit according to claim 1, wherein at least one tab is deformable elastically.

3. The protection kit according to claim 2, further comprising a foot comprising:
   at least one base post comprising a lower portion configured to be fastened to the ground and an upper portion fitted with longitudinal slots exiting at its upper extremity, the base post being configured to receive the post in its interior;
   an anchor plate comprising openings configured to receive parts of the upper portion separated by the slots; and
   a locking cone configured to surround the post and to crush the parts of the upper portion separated by the slots on the post when the locking cone is moved vertically downwards, so as to attach the post onto the base post.

4. The protection kit according to claim 3, further comprising intermediate slots interspersed between said longitudinal slots and being shorter than said longitudinal slots.

5. The protection kit according to claim 1, further comprising a foot comprising:
   at least one base post comprising a lower portion configured to be fastened to the ground and an upper portion fitted with longitudinal slots exiting at its upper extremity, the base post being configured to receive the post in its interior;
   an anchor plate comprising openings configured to receive parts of the upper portion separated by the slots; and
   a locking cone configured to surround the post and to crush the parts of the upper portion separated by the slots on the post when the locking cone is moved vertically downwards, so as to attach the post onto the base post.

6. The protection kit according to claim 5, further comprising intermediate slots interspersed between said longitudinal slots and being shorter than said longitudinal slots.

7. The protection kit according to claim 1, wherein the post further comprises at least one first pre-scoring to form, along a tear-out of at least one pre-scored portion, a first opening for a sleeve.

8. The protection kit according to claim 7, wherein the post further comprises, in a location opposite the first pre-scoring, a second pre-scoring to form, after tearing out, an opening to receive a rail.

9. The protection kit according to claim 8, wherein the second pre-scoring comprises two symmetrical portions separated by a slot and by an opening configured to receive the head of a tool.

10. The protection kit according to claim 9, wherein the first pre-scoring comprises two portions, that jointly substantially cover a gap between a projection of a transverse cross-section of the rail on the post and a projection of a transverse cross-section of the sleeve on the post, separated by teeth and each portion comprising an opening configured to receive the head of a tool.

11. The protection kit according to claim 8, wherein the first pre-scoring comprises two portions, that jointly substantially cover a gap between a projection of a transverse cross-section of the rail on the post and a projection of a transverse cross-section of the sleeve on the post, separated by teeth and each portion comprising an opening configured to receive the head of a tool.

12. The protection kit according to claim 7, wherein the first pre-scoring comprises two portions, that jointly substantially cover the gap between the projection of the transverse cross-section of a rail on the post and the projection of the transverse cross-section of a sleeve on the post, separated by teeth and each comprising an opening configured to receive the head of a tool.

13. The protection kit according to claim 7, wherein the post further comprises two openings for sleeves positioned at right angles and separated by a reinforcement.

14. A method for assembling a protection kit, comprising the steps of:
   positioning at least one hollow post comprising at least one side opening formed through a side wall of the post, the side opening comprising a tooth on a periphery of the opening and extending toward a center of the opening;
   providing at least one tubular sleeve having opposing first and second ends and defining an inner diameter, the sleeve further comprising at least one deformable tab formed at the first end of the sleeve, the tab comprising a portion of a side wall of the sleeve formed between cut-out sections of the side wall, such that a first end of the tab is connected to the sleeve and an opposing second end is radially deflectable, the tab having a unbiased state wherein the tab extends substantially parallel to the side wall of the sleeve and an inwardly biased state wherein the second end of the tab is deflected towards a center of the sleeve, and wherein said at least one tab comprises a hole between the first and second ends of the tab;
   inserting the first end of said sleeve into the at least one side opening, so as to engage the second end of the at least one tab with the tooth to bias said at least one tab to the inwardly biased state to deform said at least one tab until said tooth is located in the hole of said at least one tab;
   providing a rail having an outer diameter corresponding to the inner diameter of the sleeve; and
   inserting the rail in the second end of said sleeve, wherein the insertion of the rail into the interior of the sleeve moves said at least one tab to the unbiased state with the tooth fully engaged in the hole, thereby locking the sleeve, the post and the rail to each other.

15. The method according to claim 14, further comprising the steps of:
   anchoring a base post in the ground, comprising a lower portion configured to be fastened to the ground and an upper portion fitted with longitudinal slots exiting at its upper extremity, said base post being configured to receive a post in its interior;
   positioning an anchor plate by inserting parts of the upper portions separated by the longitudinal slots in anchor plate's openings; and
   moving vertically downwards a locking cone that surrounds the post to crush the parts of the upper portion separated by the slots on the post, so as to attach the post onto the base post.

* * * * *